United States Patent [19]

Tibbles

[11] Patent Number: 4,459,872
[45] Date of Patent: Jul. 17, 1984

[54] CLUTCH ACTUATOR

[75] Inventor: Thomas T. Tibbles, Livonia, Mich.

[73] Assignee: Ford Motor Company, Dearborn, Mich.

[21] Appl. No.: 335,134

[22] Filed: Dec. 28, 1981

[51] Int. Cl.³ .................... F16H 37/08; F16H 37/00
[52] U.S. Cl. .................................... 74/701; 74/689; 74/335; 192/3.57
[58] Field of Search ............... 74/700, 701, 335, 689; 192/4 C, 3.57, 3.08, 3.58, 3.62

[56] References Cited

U.S. PATENT DOCUMENTS

| 2,100,810 | 11/1937 | Livermore . | |
| 2,753,025 | 7/1956 | Reis | 192/3.57 |
| 2,753,726 | 7/1956 | Harris | 192/3.57 |
| 3,001,413 | 9/1961 | Burckhardt . | |
| 3,557,918 | 1/1971 | Akima | 192/3.57 |
| 3,734,252 | 5/1973 | Ahlen | 192/3.57 |
| 3,941,007 | 3/1976 | Webber et al. | 192/3.57 |

FOREIGN PATENT DOCUMENTS

| 1655894 | 3/1970 | Fed. Rep. of Germany | 74/689 |
| 538725 | 1/1956 | Italy | 192/3.57 |
| 1243745 | 8/1971 | United Kingdom | 74/701 |
| 2032544 | 5/1980 | United Kingdom | 192/3.57 |

Primary Examiner—Allan D. Herrmann
Assistant Examiner—D. Wright
Attorney, Agent, or Firm—Frank G. McKenzie; Donald J. Harrington

[57] ABSTRACT

A mechanical synchronizer clutch selectively connects drive gears to an output shaft in response to movement of an actuator piston that pressurizes a hydraulic disc clutch following engagement of the synchronizer clutch with the gears. The disc clutch applies power to the gear train and removes torque therefrom so that the synchronizer clutch can produce engagement under no load. A variable diameter belt driven transmission produces an infinite range of speed ratios between the driven and the driving shaft. The driven shaft is coupled to an output shaft through the forward drive and reverse drive gear elements.

3 Claims, 5 Drawing Figures

CLUTCH ACTUATOR

BACKGROUND OF THE INVENTION

1. Field of the Invention

The present invention relates to the field of stepless variable speed ratio transmissions. More particularly, this invention concerns that portion of the hydraulic control circuit for such transmissions that coordinates the engagement of forward and reverse drive gears with the engagement of friction clutches.

2. Description of the Prior Art

Stepless variable V-belt transmissions include a primary pulley and a secondary pulley. Each pulley includes a pair of conical discs, at least one disc of a pair being axially moveable toward and away from the other disc of that pair. A primary fluid pressure cylinder controls the spacing between the discs of the driving pulley and a secondary fluid pressure cylinder controls the spacing between the discs of the driven pulley.

Because the driving and driven shafts always turn in the same direction, a gear set is used to produce the reverse drive direction and generally a forward drive ratio reduction gear is included. The shaft driven by the gears is selectively driveably connected to the driven gears through the operation of a synchronizer clutch that requires axial shifting movement of a spline sleeve into engagement with dogteeth formed integrally with the gears. The pinions of the gear set are connected through a friction clutch to a shaft that is driven by the endless belt. Another arrangement involving synchronizers and friction clutches is present in a countershaft automatic transmission that requires operation of a synchronizer clutch to driveably connect gears to the countershaft on which they are carried. The gears are driven from a power source through operation of friction clutches that connect the power source to the pinions of the gear set.

In each of these transmissions it is required that the synchronizers engage the dogteeth of the gears while the driven gear has no load applied. This necessarily requires that the synchronizer be moved during the period when the clutch is disengaged and the load disconnected from the gear set. It is essential that the friction clutch not be engaged until the correct engagement is made by the synchronizer clutch.

SUMMARY OF THE INVENTION

An actuator according to the present invention moves the sleeve of a synchronizer clutch into engagement with a gear that is selected by the vehicle operator through movement of a manually operated valve. The actuator applies hydraulic pressure to engage a friction clutch, which connects the pinions of a gear set to a shaft driven from a power source. The actuator operates such that the friction clutch is disengaged before the synchronizer sleeve is moved and is engaged only after the synchronizer has become engaged with the selected gear.

BRIEF DESCRIPTION OF THE DRAWINGS

FIGS. 3A and 3C show the piston at opposite extremities within a cylinder and FIG. 3B shows the piston at an intermediate position.

DESCRIPTION OF THE PREFERRED EMBODIMENTS

Figures 1, 2:
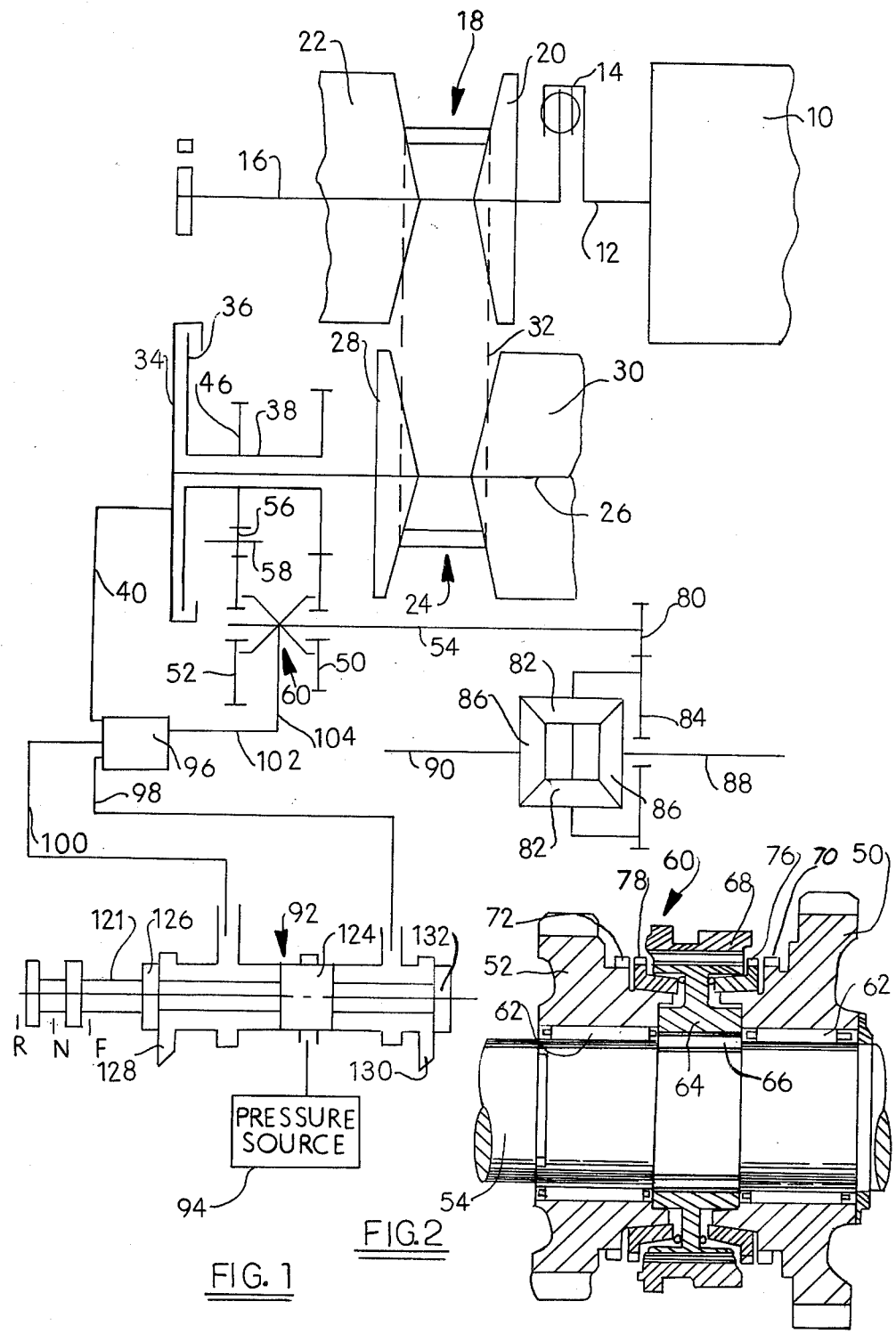
FIG. 1 is a schematic diagram of a continuously variable transmission arranged for use with a transversely mounted engine employing the clutch actuator of the present invention.
FIG. 2 is a cross section through a synchronizer clutch adapted to selectively connect gears to the shaft on which they are journalled.

Referring first to FIG. 1, an engine, an electric motor or other power source 10 has its driveshaft 12 connected through a spring damper 14 to a first shaft 16 aligned with the driveshaft. The spring damper operates to isolate engine firing pulses. The first shaft carries a first variable pulley 18 that includes a fixed flange 20 secured to the shaft against relative rotation with respect to the shaft and a moveable flange that rotates with shaft 16 but can be moved axially relative to the fixed flange.

A second variable pulley 24 is mounted on a second shaft 26 arranged parallel to the input shaft. The pulley includes a fixed flange 28 that is secured to the shaft against relative rotation and a moveable flange 30 that turns with the shaft 26 but can be moved axially along the shaft toward and away from the fixed flange. A drive belt 32 is mounted on the inner drive surfaces of the pulleys 18 and 24 to transmit power between shafts 12 and 26. The drive ratio between the shafts is determined by the position of the moveable flanges of the pulley with respect to the fixed flanges. A variable drive ratio results because the radius at which the drive belt engages the pulleys may vary continuously with the change in position of the moveable flanges with respect to the fixed flanges. FIG. 1 shows the drive radius of the drive belt being nearly identical on the two shafts but the drive radius of the belt on each of the shafts can vary to produce a speed ratio upon demand of the vehicle operator.

A friction disc clutch 34 has its sleeve or casing portion fixed to the second shaft 26 and its friction disc or rotor portion 36 mounted on a sleeve shaft 38. Clutch 34, when pressurized through a hydraulic line 40, causes a frictional driving engagement to be produced between the disc and the casing whereby shaft 26 can be driveably connected to shaft 38. When pressure is removed from the piston, the hydraulic cylinder of the clutch drains to tank or exhaust through line 40, actuator 96, line 100 and manual valve 92. The tank is an unpressurized reservoir from which the hydraulic control circuitry of the transmission is supplied and into which the hydraulic fluid returns.

Sleeve shaft 38 has a reverse drive pinion 46 and a forward drive pinion 48 fixed thereto. Forward drive output gear 50 and reverse drive output gear 52 are journalled on an output shaft 54. A reverse idler 56 is in continuous meshing engagement with pinion 46 and gear 52 and is supported on a stub shaft 58.

A synchronizer clutch mechanism 60 of the type shown schematically in FIG. 1 is presented in detail in FIG. 2. Output gears 50, 52 are supported on the output shaft 54 by needle bearings 62. A synchronizer clutch hub 64 is splined at 66 to shaft 54. The hub has external splines on which an internally splined clutch sleeve or slider 68 is supported. Sleeve 68 is formed with internal clutch teeth that are adapted to engage external clutch teeth 70, 72 formed on the hubs of gears 50, 52, respectively. Conventionally, synchronizer clutch rings 76, 78 are provided between the hub 64 and the gears 50 and 52, respectively. Sleeve 68 is formed with a recess which is engaged by a fork that can be moved parallel to the axis of shaft 54, thus causing sleeve 68 to engage clutch teeth 70 and 72 depending on the direction of its movement. In this way, gears 50 and 52 are selectively coupled to the shaft.

Output shaft 54 drives output pinion 80, which drives bevel pinions 82 through gear 84. Side bevel gears 86 are secured to driveshafts 88, 90 that transmit power to the drivewheels of the vehicle.

A manual valve 92, whose state is controlled by motion of the gear selector between forward and reverse drive positions, is supplied with pressurized fluid from a pressure source 94 and is connected to the unpressurized tank via exhaust ports 128, 130. Valve 92 is connected hydraulically to a clutch actuator 96 first and second hydraulic passages 98 and 100, which alternately supply pressurized hydraulic fluid to the actuator and which communicate with the first and second sides 103 and 105, respectively, of piston 108. Clutch actuator 96 has a moveable member 102 to which the shift fork 104 is attached for movement parallel to the axis of shaft 54. As member 102 moves rightward and leftward, gears 50 and 52 are selectively connected driveably to the output shaft through operation of synchronizer clutch mechanism 60.

Figure 3A:
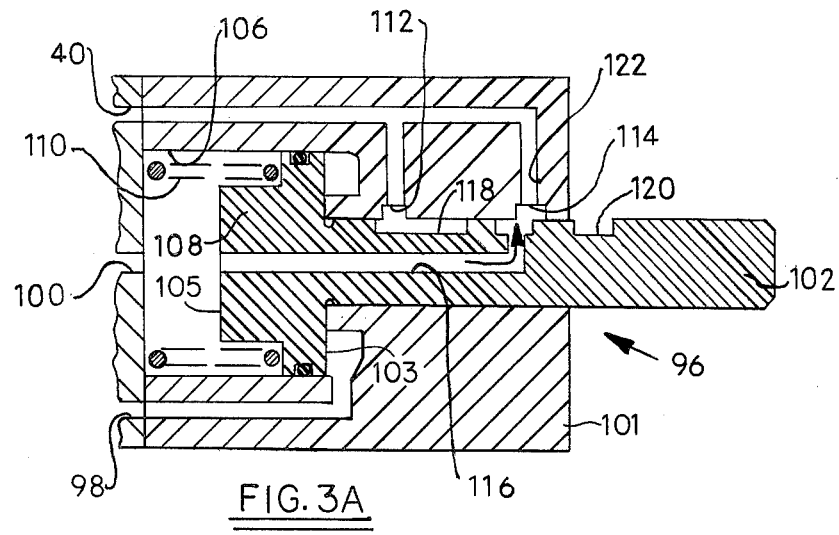
FIGS. 3A, 3B and 3C show three cross sections through the axis of a clutch actuator whose piston is located at various operating positions.
Figure 3B:
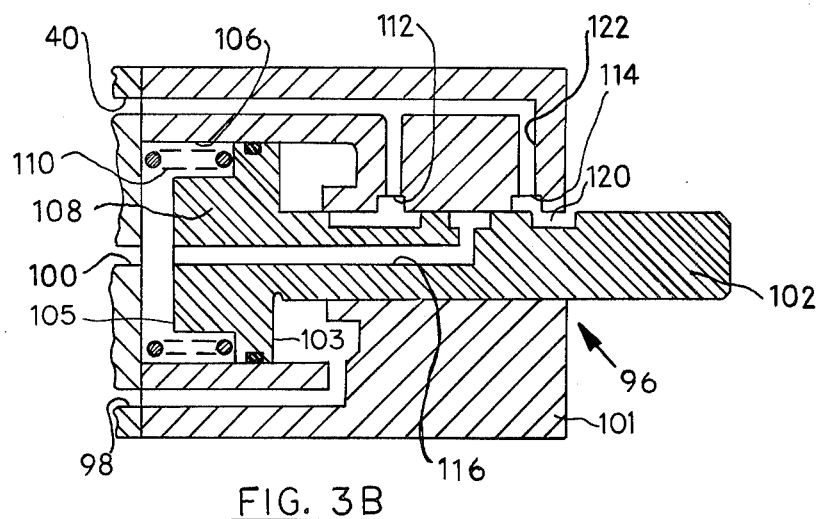
Figure 3C:
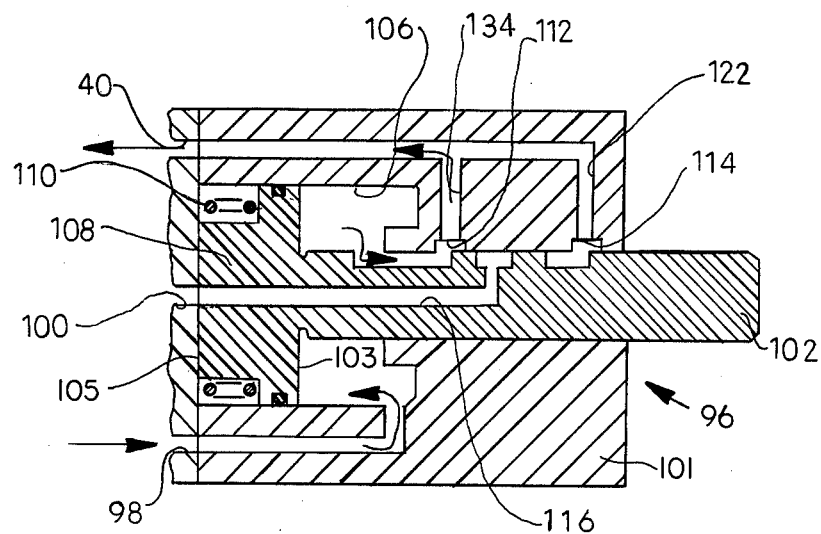

Referring now to FIGS. 3A, 3B, and 3C, the body 101 of the actuator defines a cylinder 106 within which piston 108 moves under the influence of a bias spring 110 and pressure force developed on axially opposite sides of the piston.

FIG. 3A shows the actuator disposed to produce forward drive. In this condition, manual valve 92, when shifted by the vehicle operator to the forward drive position, operates to hydraulically communicate the source of hydraulic pressure 94 through line 100 with cylinder 106 on the left side of piston 108. Manual valve 92 also hydraulically connects the cylinder on the right side of piston 108 through line 98 to tank.

The actuator body 101 is formed with a first port 112 and a second port 114 that are spaced from one another along the axis of the cylinder 106. Piston 108 is formed with a central passage 116 having a radially directed terminal portion, which is put into communication with port 114 when the piston is moved to the right end of the cylinder. Member 102 and the ports 112 and 114 define valve lands that act on valve means for controlling operation of the clutch 34. Passage 116 does not allow communication with port 112 when the piston is moved to the left end of the cylinder. As shown in FIG. 3C, the piston has another recess 118 that permits communication between the right end of the cylinder and port 112 when the piston is moved to the left end of the cylinder, and prevents communication between the cylinder and ports 112 and 114 when the piston is moved to the right side of the cylinder.

A third recess 120 formed on the piston, which forms an exhaust port, connects port 114 to exhaust when the piston is at an intermediate position as shown in FIG. 3B. This allows passage 122 to be depressurized during the period when the piston is moving from the right to the left end of the cylinder and before the right-hand of the cylinder is brought into communication with the port 112.

In operation, when spool 121 of manual valve 92 is moved to the forward drive position at F, valve land 124 opens communication between the pressure source, whose pressure is approximately 60 p.s.i., and actuator 96 through line 100. Land 126 closes communication between line 100 and exhaust port 128; line 98 communicates with exhaust port 130.

This causes piston 108 to move to the right-hand end of cylinder 106 due to the effect of the spring and the pressure force developed on the left end of the piston. The right-hand end of the cylinder has been exhausted through line 98. This moves the radial end of passage 116 into communication with port 114 and from there through lines 122 and 40 to pressurize and actuate clutch 34.

When the spool of manual valve 92 is moved to the reverse drive position at R, valve land 124 opens communication between the pressure source and line 98. Land 132 closes communication between line 98 and exhaust port 130 and line 100 communicates with exhaust port 128. This causes the right-hand side of cylinder 106 to be pressurized and the left side to be exhausted. The pressure force on the right-hand face of piston 108 moves the piston to the left end of the cylinder thereby closing communication between the pressure source and port 114 and opening communication between the pressure source and port 112. In making this transition between the forward drive and reverse drive positions, recess 120 is brought into communication with port 114 and with the exhaust or tank thereby draining passage 122. Pressurized hydraulic fluid, therefore, communicates through passage 134 and line 40 to pressurize and cause engagement of clutch 34.

Axial movement of the piston causes movement of shift fork 104 which produces the selective driveable connection between gears 50, 52 and the output shaft 54. The synchronizer clutch sleeve 68, which is moved by the shift fork 104, engages the clutch teeth 70 and 72 before clutch 34 is engaged. This occurs because the distance through which sleeve 68 moves to produce engagement with the clutch teeth is less than the distance the piston must move in order to pressurize line 40 and to actuate the clutch.

The term synchronizer clutch means any shifter for driveably connecting a gear to a shaft by shifting motion to engage dog teeth regardless of whether the shaft and gear motions are synchronized. For example, the shift sleeves of the synchronizer clutches might engage the dog teeth formed on the gear without resort to engagement of the dog teeth on the synchronizer cones or the use of synchronizer cones or any other means for synchronizing the speeds.

Having described a preferred embodiment of my invention what I claim and desire to secure by U.S. Letters Patent is:

1. A continuously variable transmission comprising:
   an input shaft driven from a power source carrying a first variable pulley;
   a second shaft carrying a second variable pulley and a drive belt adapted to transmit power between the input shaft and the second shaft by driveably engaging the first and second pulleys;
   gear means for transmitting power from the second shaft;
   clutch means for driveably coupling the gear means to the second shaft;
   an output shaft;

a synchronizer clutch for selectively coupling the gear means to said output shaft;

means for actuating the clutch means whereby the synchronizer clutch couples the gear means to said output shaft before the clutch means couples the gear means to the second shaft;

the actuator means comprising an actuator body defining a cylinder within which a piston moves between first and second operating positions, the body defining first and second ports spaced from one another;

a manual valve for selectively pressurizing the first and second sides of the piston whereby the piston moves within the cylinder in response to a pressure force developed on the pressurized side of the piston;

valve means including first lands in said body and registering second lands on the piston for opening communication between the first side of the piston and a first port when said first piston side is pressurized and for opening communication between said second side of the piston and a second port when said second piston side is pressurized, said first and second ports being formed in said actuator body and communicating with said clutch means; and an exhaust port on said piston adapted to register with one of said ports when the piston is in an intermediate position between said first and second operating positions.

2. The combination as set forth in claim 1 wherein:

the synchronizer clutch is moved to its first operating position to couple a portion of the gear means to its shaft in response to movement of the actuating means and the synchronizer clutch is moved to its second operating position to couple another portion of the gear means to its shaft in response to movement of the actuating means, the synchronizer clutch coupling the gear means to said output shaft before communication is opened between the first side of the piston and the first port.

3. The combination as set forth in claim 2 wherein the manual valve means is adapted to be moved manually between forward drive and reverse drive positions.

* * * * *